UNITED STATES PATENT OFFICE.

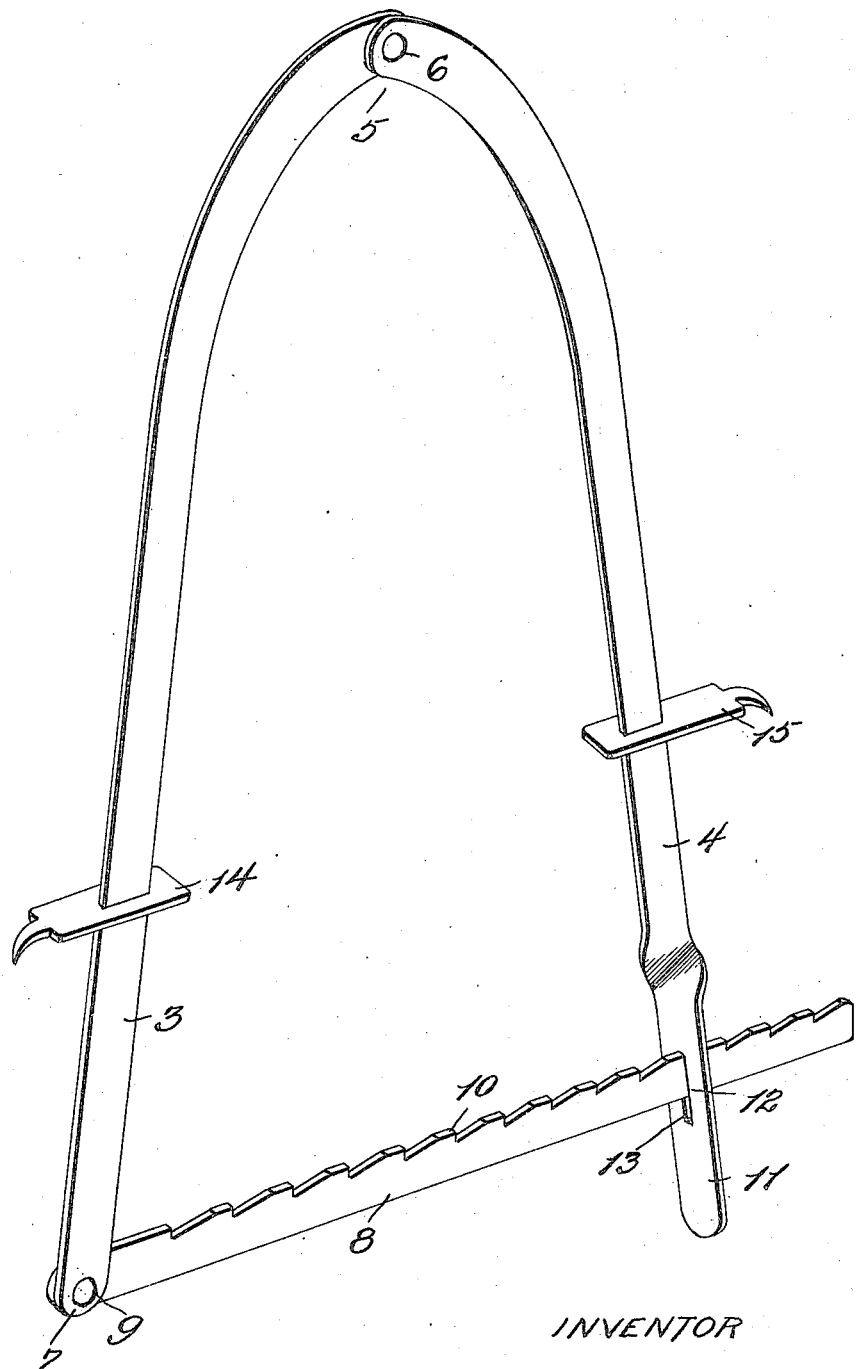

OTTO G. BICK, OF ST. LOUIS, MISSOURI, ASSIGNOR TO WESTERN STAMPING COMPANY, OF ST. LOUIS, MISSOURI, A CORPORATION OF MISSOURI.

SKIN-STRETCHER.

1,363,449.      Specification of Letters Patent.      Patented Dec. 28, 1920.

Application filed June 23, 1920. Serial No. 391,231.

*To all whom it may concern:*

Be it known that I, OTTO G. BICK, a citizen of the United States of America, residing at 214 North Second street, St. Louis, State of Missouri, have invented certain new and useful Improvements in Skin-Stretchers, of which the following is a specification.

The object of my invention is to manufacture a skin stretcher which will be simple in construction, cheap in cost of manufacture and that can be simply manually operated.

A further object is to so make a skin stretcher, that the skin or hide to be stretched will be detachably secured to moving elements, which are slidably secured to other members which themselves are movable relative each other so that the skin may be efficiently stretched.

With the above and other objects in view my invention has relation to certain novel features of construction and operation, examples of which are described in the following specification and illustrated in the accompanying drawing in which—

The single figure is a perspective view of my device.

Numerals 3 and 4 designate two stretcher arms made of solid metal or wire, rotatively secured at 5 by the rivet 6.

To the lower end 7 of the arm 3 is rotatively secured the cross tie 8 by means of the rivet 9. The inner edge of the cross tie 8 is serrated as shown at 10. The lower end of the arm 4 is turned ninety degrees as shown at 11 and has the rectangular slot 13 cut therethrough as shown at 12 so that the cross tie 8 can be slid therethrough.

By a rotation of the arms 3 and 4 within limits the cross tie 8 will be moved through the slot 13 and by virtue of the serrated edge 10 the arms 3 and 4 may be selectively locked in various positions.

Numerals 14 and 15 indicate two sliding hooks which are in sliding engagement with the arms 3 and 4, the hooks projecting outwardly relative the arms.

The operation of my device is as follows: The arms are rotated until their free ends practically meet and the hooks 14 and 15 are properly positioned and the cross tie 8 extends through the slot 13; the arms 3 and 4 are then inserted in the skin that is to be stretched and the skin is fastened, or secured to the hooks 14 and 15 at its end; the hooks are then gradually moved toward the free ends of the arms 3 and 4 and the arm 8 is gradually moved or slid out of the slot 13. In this way the skin may be stretched until the hooks 14 and 15 have practically reached the free ends of the arms 3 and 4 and the cross tie reached the last of its serrations.

What I claim and mean to secure by Letters Patent is.

In combination with two arms of rectangular cross-sections rotatively secured together, hooks having a rectangular slot cut therein, said hooks slidably secured to said arms for their entire lengths by having said arms pass through the slots of said hooks, a tie rod having its entire inner surface serrated, said tie rod rotatively secured to one of the free ends of one of said arms, the other of said arms having a rectangular slot cut therein near its external extremity, said tie rod passing through the slot in one of said arms.

In testimony whereof I affix my signature.

OTTO G. BICK.